(12) United States Patent
Masuda et al.

(10) Patent No.: US 6,616,241 B1
(45) Date of Patent: Sep. 9, 2003

(54) ROTATION LIMITING DEVICE AND SEAT RECLINER DEVICE USING THE SAME

(75) Inventors: Kou Masuda, Yokohama (JP); Takeshi Nakamura, Yokohama (JP); Osamu Ohki, Yokohama (JP)

(73) Assignee: NHK Spring Co., Ltd., Kanagawa (JP)

( * ) Notice: Subject to any disclaimer, the term of this patent is extended or adjusted under 35 U.S.C. 154(b) by 0 days.

(21) Appl. No.: 09/669,363

(22) Filed: Sep. 26, 2000

(30) Foreign Application Priority Data

Nov. 16, 1999 (JP) .............................. 11-325063

(51) Int. Cl.$^7$ .............................................. A47B 97/00
(52) U.S. Cl. .................................. 297/463.1; 297/361.1
(58) Field of Search .......................... 297/463.1, 361.1, 297/374; 192/223.2, 44

(56) References Cited

U.S. PATENT DOCUMENTS

| | | | |
|---|---|---|---|
| 4,962,963 A | 10/1990 | Robinson | |
| 5,718,482 A | 2/1998 | Robinson | |
| 5,896,973 A | 4/1999 | Hochmuth et al. | |
| 6,032,777 A | * | 3/2000 | Denis |

FOREIGN PATENT DOCUMENTS

| | | |
|---|---|---|
| EP | 0 631 901 A1 | 1/1995 |
| GB | 919279 | 2/1963 |
| JP | 10-234507 A2 | 9/1998 |
| JP | 10-234507 | 9/1998 |

* cited by examiner

Primary Examiner—Milton Nelson, Jr.
(74) Attorney, Agent, or Firm—Marshall & Melhorn, LLC (57) ABSTRACT

The engagement between the first and second members is accomplished by the wedging of roller members so that the first and second members can be held rotationally fast to each other in a continuous manner or at any desired angular position. A pair of roller members are received in a chamber defined between the first and second members, and are normally urged into wedging engagement in the circumferential ends of the chamber under the spring force of a spring member, but may be disengaged so as to allow free relative rotation between the first and second members by displacing the roller members toward each other against the spring force of the spring member by using actuation members. Thus, the relative rotation in either direction can be prevented, and the releasing of the first and second members can be accomplished simply by slightly moving the roller members.

12 Claims, 7 Drawing Sheets

ROTATION LIMITING DEVICE AND SEAT RECLINER DEVICE USING THE SAME

TECHNICAL FIELD

The present invention relates to a rotation limiting device for selectively locking a first member relative to a second member at a desired angular position. The present invention also relates to a seat recliner device using such a rotation limiting device.

BACKGROUND OF THE INVENTION

A conventional seat recliner device typically uses a combination of gear teeth and a pawl for selectively retaining the seat back at a desired angular position relative to the seat bottom. Due to the nature of engagement between gear teeth and a pawl, such a recliner device is capable of angular adjustment only in a discrete manner or can be locked only at a number of discrete angular positions. This disadvantage is particularly pronounced when a recliner device is provided on each side of the seat because the two recliner devices may not be properly synchronized due to dimensional or positional errors. For instance, the two recliner devices may fail to lock simultaneously or may be locked simultaneously only if the seat back is undesirably twisted.

Providing a recliner device on each side of the seat is beneficial in ensuring the mechanical strength of the seat back against tilting. This is particularly important when the upper end of the seat belt is anchored to the seat back because the seat back is required to withstand the tension of the seat belt at the time of a vehicle crash or other high acceleration situations.

Japanese patent laid-open publication No. 10-234507 discloses a reclining limiting device for a seat back using a ball-type one-way clutch. When this ball-type one-way clutch is used in such an orientation that the locking action of the one-way clutch resists the forward reclining movement of the seat back, the high mechanical resistance of the locking action enables a highly firm retention of the angular position of the seat back against forward tilting. When this ball-type one-way clutch is used in the opposite orientation, the locking action of the one-way clutch resists the rearward reclining movement of the seat back.

However, because this previously proposed arrangement is capable of preventing the rotation in only one direction, it is required to be installed in addition to the conventional recliner device using other retaining means. This adds to the complexity of the recliner device, and increases both the size and weight of the vehicle.

BRIEF SUMMARY OF THE INVENTION

In view of such problems of the prior art, a primary object of the present invention is to provide a rotation limiting device which is capable of locking at any desired position, and resisting rotation in either direction.

A second object of the present invention is to provide a rotation limiting device which can provide a high mechanical strength against rotation by using a relatively simple structure.

A third object of the present invention is to provide a rotation limiting device which is suited to be incorporated in a seat recliner device.

A fourth object of the present invention is to provide a seat recliner device incorporated with such a rotation limiting device.

A fifth object of the present invention is to provide a seat recliner arrangement which ensures a favorable synchronism between two seat recliner devices provided on either side of the seat.

According to the present invention, these and other objects of the present invention can be accomplished by providing a rotation limiting device for selectively preventing a relative rotation between two members, comprising: a first member including an inner cam member defining a substantially circular outer circumferential surface; a second member supported by the first member for relative rotation around a center of the outer circumferential surface and defining a substantially circular inner circumferential surface disposed coaxially with respect to the outer circumferential surface so as to define an annular gap between the inner and outer circumferential surfaces; a first roller member received in the annular gap so as to be selectively wedged between the inner and outer circumferential surfaces to oppose a relative rotation of the first and second members in a first direction; a second roller member received in the annular gap so as to be selectively wedged between the inner and outer circumferential surfaces to oppose a relative rotation of the first and second members in a second direction which is opposite from the first direction; and an actuation member which is adapted to act upon the roller members so as to selectively disengage the roller members from an wedging engagement between the inner and outer circumferential surfaces.

Because the engagement between the first and second members is accomplished by the wedging of roller members, which may include any members that can roll including, not exclusively, cylindrical rollers, balls, and other elliptic and hourglass shaped members, the first and second members can be held rotationally fast to each other in a continuous manner or at any desired angular position. If the roller members have a circular profile, the chamber receiving the roller members should have a relatively wide middle part and circumferential ends which get progressive narrower toward their ends, and each of the roller members should be narrower than the relatively wide middle part of the chamber, but wider than the circumferential ends of the chamber.

According to a preferred embodiment of the present invention, a spring member, typically consisting of a compression coil spring interposed between the roller members, is disposed in the annular gap to urge the roller members so as to be wedged between the inner and outer circumferential surfaces. The actuation member may consist of a first actuation member and a second actuation member which are rotatably supported by one of the first and second members, and each of the actuation members may be provided with an axial projection which is adapted to act upon a corresponding one of the roller members to displace it away from a corresponding one of the narrower circumferential ends of the chamber against a spring force of the spring member. The actuation members can be actuated by hand via a lever member, by an end of a power transmission member such as a pull cable, or by an electric motor or other power actuators.

Such a rotation limiting device is very suitable for use in a seat recliner device. For instance, a seat recliner device according to the present invention may comprise a seat bottom bracket adapted to be attached to a seat bottom and incorporated with an inner cam member defining a substantially circular outer profile; a seat back bracket adapted to be attached to a seat back and pivotally joined with the seat bottom bracket, the seat back bracket defining a recess defining a chamber in cooperation with the outer profile of the inner cam member, the chamber including a relatively wide middle part and gets progressive narrower toward each circumferential end; a pair of roller members receives in the chamber, each of the roller members being narrower than the relatively wide middle part of the chamber, but wider than the circumferential ends of the chamber; a spring member which normally urges the roller members toward the corresponding narrower circumferential ends; a release member supported by the seat bottom bracket so as to be moveable between a lock position for allowing the roller members urged by the spring member toward the narrower circumferential ends and a release position for displacing the roller members away from the narrower circumferential ends against a spring force of the spring member.

Such a seat recliner device may be used on one side of a seat so that a fine adjustment of the angular position may be achieved. It is also possible to use such a seat recliner device capable of continuous angular adjustment as a slave seat recliner device while a more conventional seat recliner device capable of only step-wise adjustment is used as a master seat recliner device. Thereby, the two seat recliner devices can be synchronized so that the two seat recliner devices can be successfully locked simultaneously at all times without involving any twisting of the seat back.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
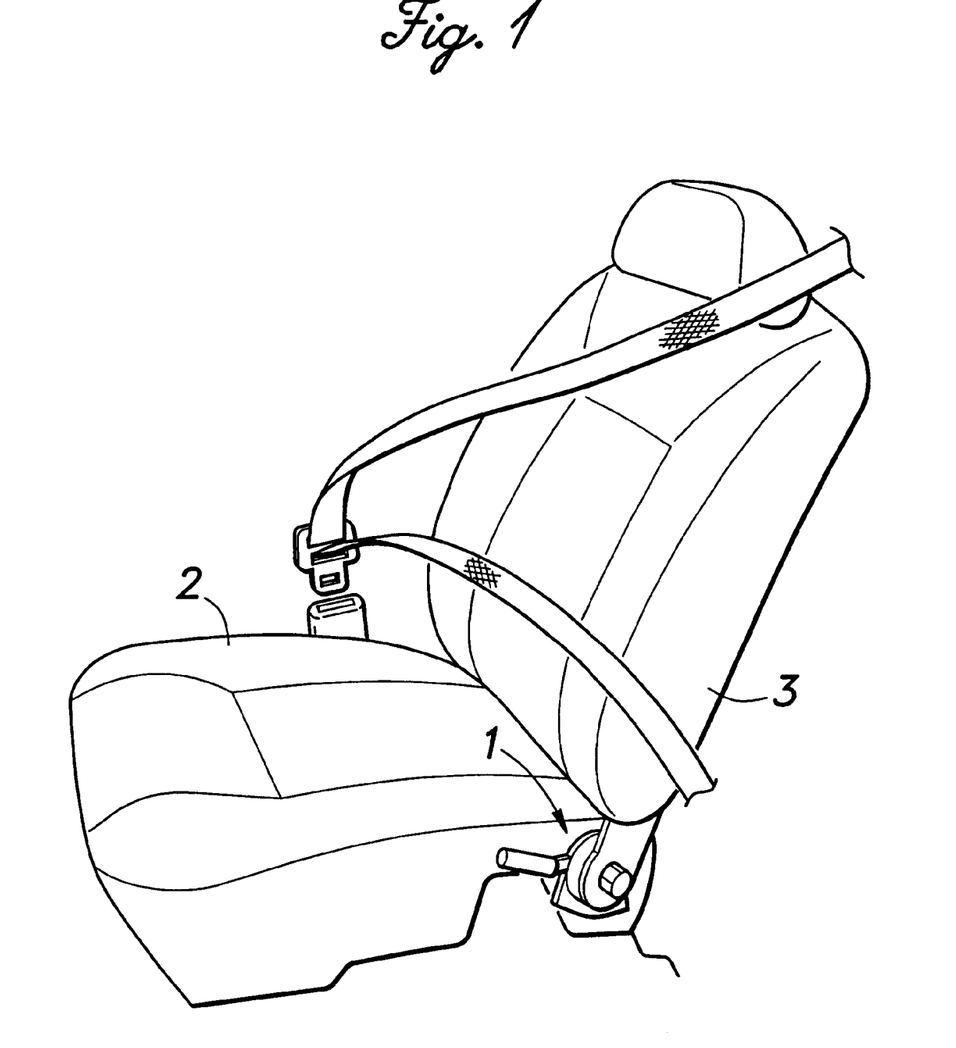
FIG. 1 is a perspective view showing a seat fitted with a recliner device embodying the present invention.

FIG. 1 shows an automotive seat including a seat bottom 2 and a seat back 3 which are pivotally joined by a pair of hinges at either side the seat bottom 2. One of the hinges, typically that of the outer side of the seat, the right side in case of a right hand side seat and the left side in case of a left hand side seat, consists of a recliner device 1 embodying the present invention for adjusting the angular position of the seat back 3.

Figure 2:
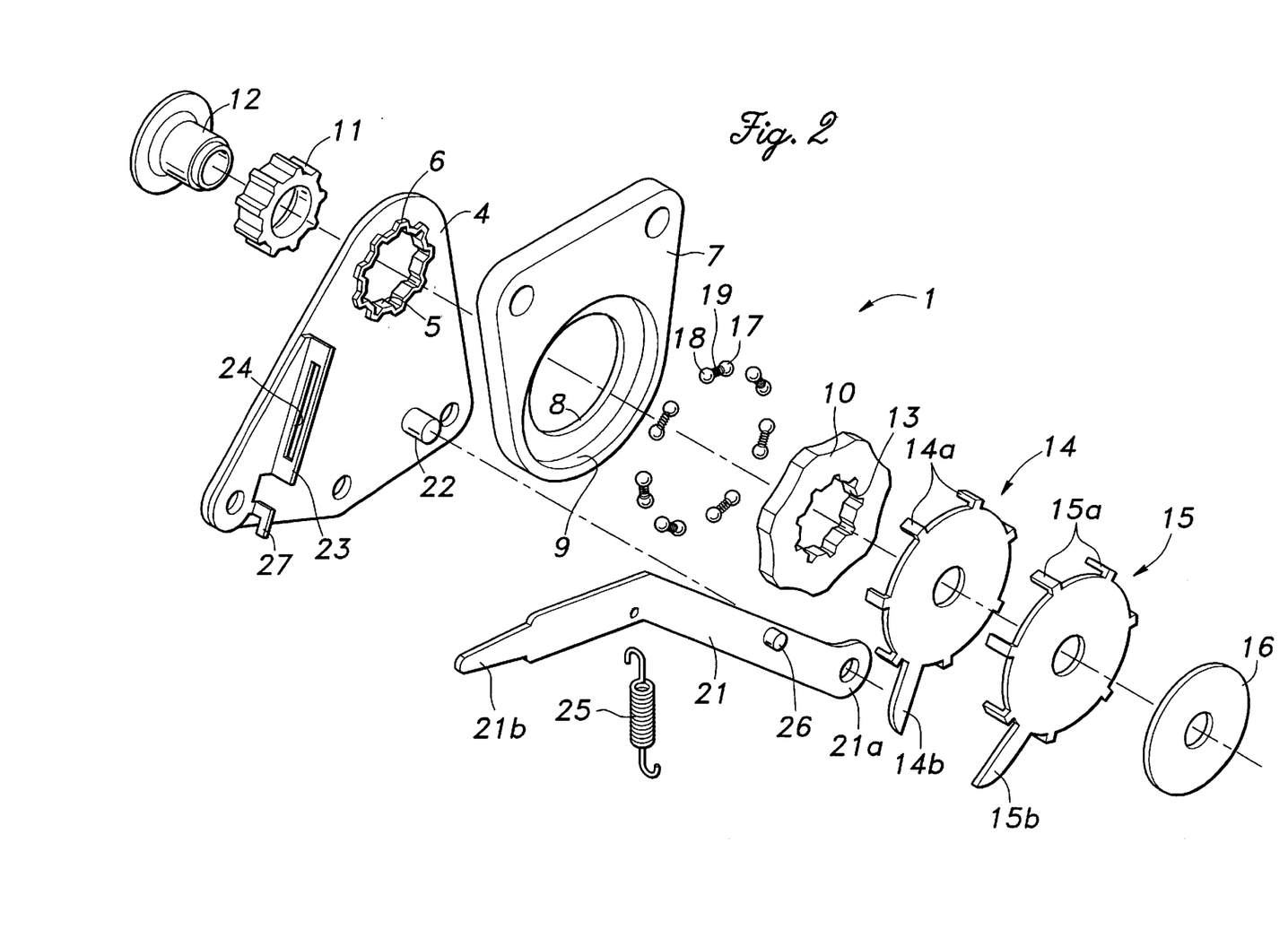
FIG. 2 is an exploded perspective view of the seat recliner device according to the present invention.
Figure 3:
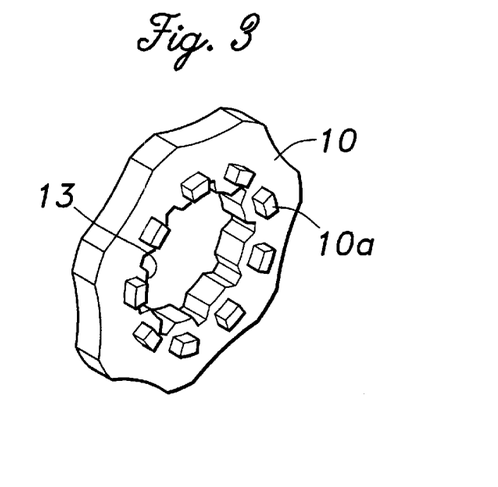
FIG. 3 is a perspective view showing the reverse side of the inner cam member.

Referring to FIGS. 2 and 3, the recliner device 1 comprises a seat bottom bracket 4 fixedly attached to the seat bottom 2, and a seat back bracket 7 fixedly attached to the seat back 3. The seat bottom bracket 4 is provided with an opening 5 having the shape of an internal gear and surrounded by a collar 6 which has an inner circumference conforming to the opening 5 and an outer circumference having the shape of an external gear. A small central gear 11 fitted onto a flanged sleeve 12 is fitted into the opening 5 of the seat bottom bracket 4. The two brackets 4 and 5 are placed one next to the other with the collar 6 fitted into an opening 8 provided in the seat back bracket 7. The seat back bracket 7 is provided with an annular recess 9 concentrically surrounding the opening 8 and facing away from the seat bottom bracket 4.

Figure 4:
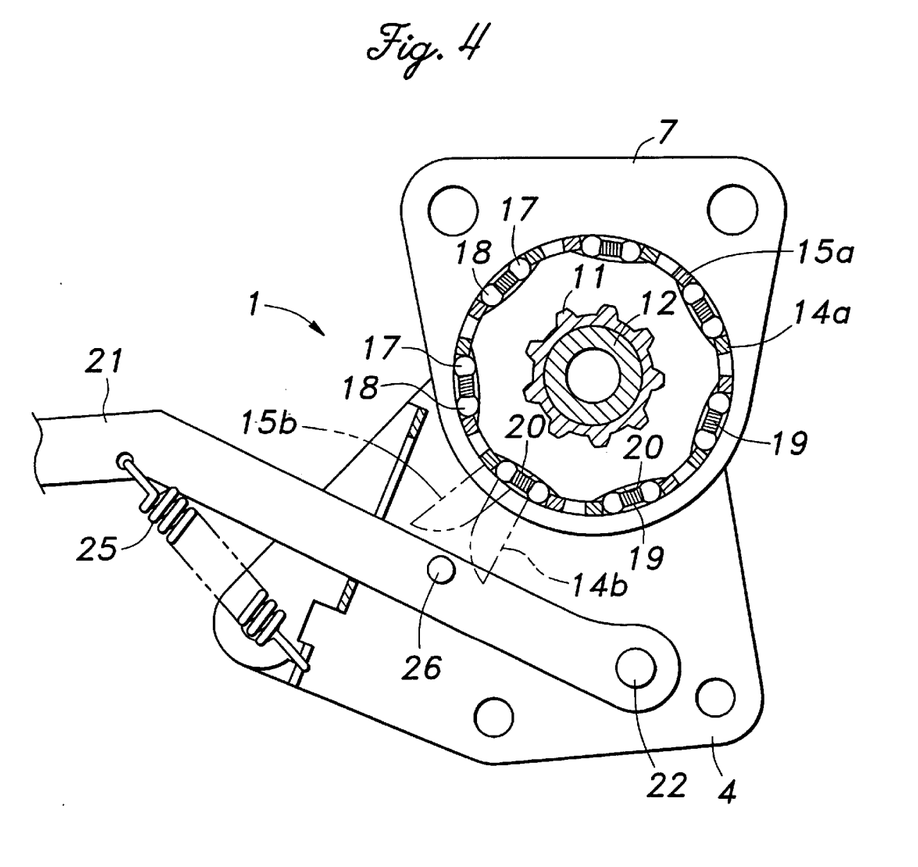
FIG. 4 is a partly broken away side view of the seat recliner device.

A polygonal disk-shaped inner cam member 10 is received in the annular recess 9, and the small central gear 11 is passed into a central opening 13 of the inner cam member 10 which is conformal to the opening 5 of the seat bottom bracket 4. As shown in FIG. 4, a plurality of chambers 20 are defined between the outer periphery of the inner cam member 10 and the inner circumferential surface of the annular recess 9. Each chamber 20 has a radial dimension which gets progressively narrower toward each circumferential end, and receives therein a pair of steel balls 17 and 18 and a compression coil spring 19 which urges the steel balls 17 and 18 away from each other or toward the narrower circumferential ends. A pair of release members 14 and 15 each consisting of a disk-shaped stamped sheet metal member is placed one over the other on the side the inner cam member 10 facing away from the seat bottom bracket 4. A cover plate 16 is placed on the outer side of the release members 14 and 15.

A free end of the flanged sleeve 12, remote from the flanged end, is passed into the central openings of the release members 14 and 15 and the central opening of the cover plate 16, and is crimped onto the cover plate 16 to join the component parts described above. As best shown in FIG. 3, the side of the inner cam member 10 facing seat bottom bracket 4 is provided with a plurality of axial projections 10a along a concentric circle which are fitted into corresponding recesses defined between the outer circumference of the collar 6 and the inner circumferential surface of the opening 8 of the seat back bracket 7. The outer circumferential surfaces of the collar 6 and the axial projections 10a jointly define a substantially cylindrical outer profile so that the seat bottom bracket 4 and the seat back bracket 7 are pivotally connected to each other with a cylindrical bearing which ensures a high load bearing capability and a low-friction.

Each of the release members 14 and 15 is provided with a plurality of axial projections 14a or 15a which extend from the outer periphery of the corresponding release member and each fit into one of the narrower circumferential ends of the corresponding chamber 20. In particular, the axial projections 14a of one of the release members 14 are received in the one narrower ends of the chambers 20 while the axial projections 15a of the other release members are received in the other narrower ends of the chambers 20. The release members 14 and 15 are each provided with a radial extension 14b or 15b, and these extensions 14b and 15b are aligned in the manner of a shear with their rounded edges facing each other.

The seat bottom bracket 4 is provided with a pivot pin 22 and an upright piece 23 both projecting therefrom in the axial direction toward the seat back bracket 7. A release lever 21 is pivotally attached to the pivot pin 22 via a base end having an opening which is fitted onto the pivot pin 22, and is provided with an actuation pin 26, at an intermediate part thereof, which is received between the two radial extensions 14b and 15b of the release members.

A free end of the lever 21 is passed through a slot 24 defined in the upright piece 23 to define the angular range of the movement of the lever 21. A tension coil spring 25 is engaged between an intermediate point of the lever 21 and an engagement piece 27 provided in a lower part of the upright piece 23 to normally urge the lever 21 downward or the actuation pin 26 radially outward away from the two radial extensions 14b and 15b of the release members 14 and 15. The axial projections and the radial extensions are positioned in such a manner that when the radial extensions are moved away from each other by forcing the actuation pin 26 between them, the axial projections are forced in the direction to move each pair of the steel balls toward each other against the spring force of the corresponding compression coil spring.

Now the mode of operation of this device is described in the following with reference to FIGS. 4 to 6. Normally, the steel balls 17 and 18 in each chamber 20 are urged toward the narrower parts of chamber 20 under the spring force of corresponding compression coil spring 19 so that steel balls 17 and 18 are wedged between the wall surfaces of inner cam member 10 and the seat back bracket 7 to keep them locked to each other against rotation in either direction (FIGS. 4 and 6).

Figure 5:
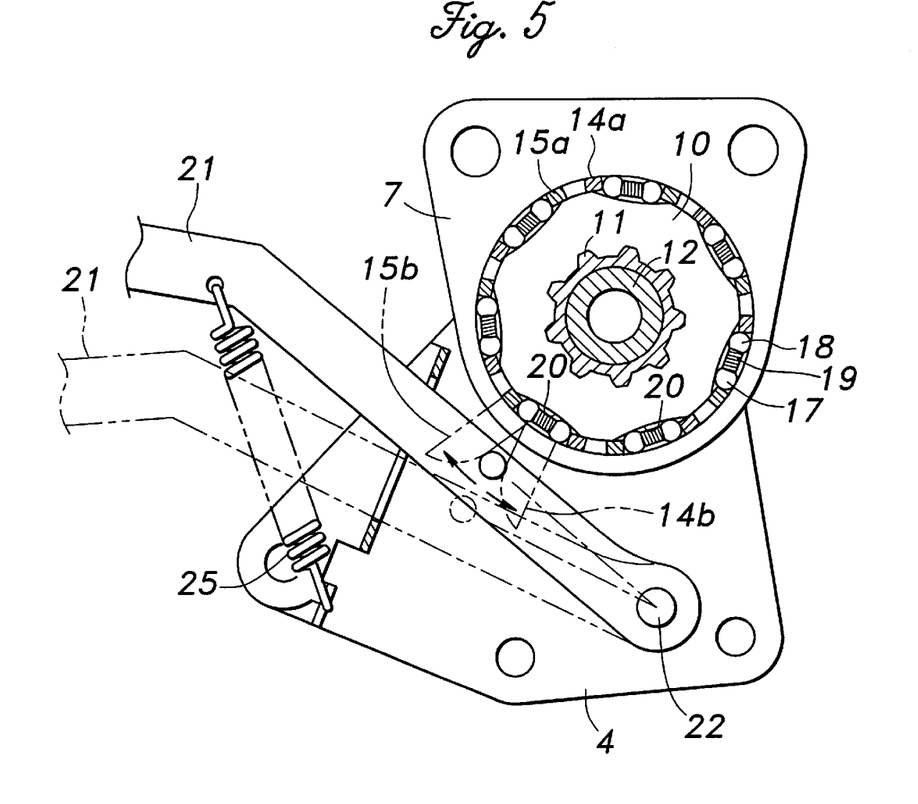
FIG. 5 is a view similar to FIG. 4 showing the locked state of the seat recliner device.
Figure 6:
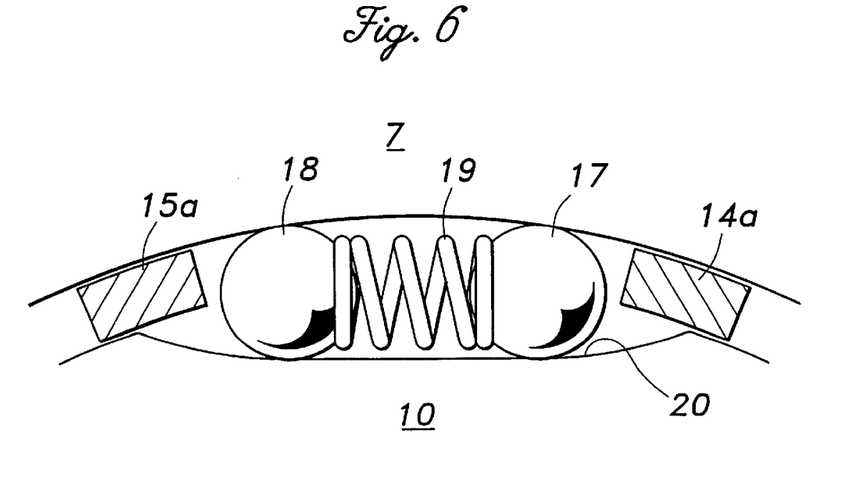
FIG. 6 is an enlarged view of a part of FIG. 4.
Figure 7:
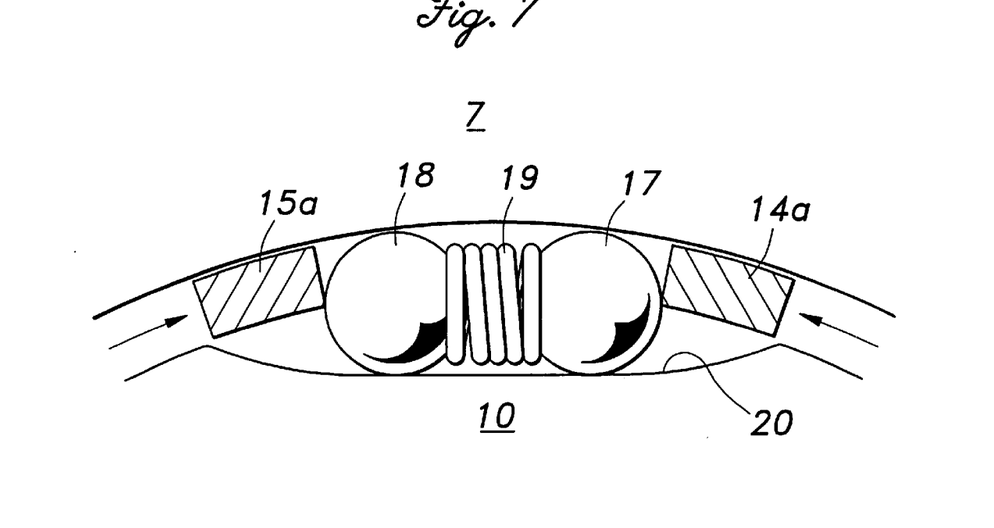
FIG. 7 is an enlarged view of a part of FIG. 5.

When the actuation lever 21 is pulled upward against the spring force of tension coil spring 25 as shown in FIG. 5, pin 26 is pushed between the radial extensions 14b and 15b of the release members 14 and 15, thereby turning the release members 14 and 15, in such a manner that the axial projections 14a and 15a are moved toward each other against the spring force of the compression coil spring 19. Therefore, the steel balls 17 and 18 are moved toward each other and away from the narrow parts of corresponding chamber 20, and the locked state is released (FIGS. 5 and 7) so that the angular position of the seat back 3 with respect to the seat bottom 2 can be adjusted at will.

When the seat back 3 is brought to a desired reclining angle, the actuation lever 21 is released with the result that actuation lever 21 returns to its original position under the spring force of the tension coil spring 25, and the steel balls 17 and 18 are again wedged between the wall surfaces of corresponding chamber 20. Therefore, the locked state illustrated in FIGS. 4 and 6 is accomplished, and the seat back 3 can be held immobile with respect to the seat bottom 2.

Figure 8:
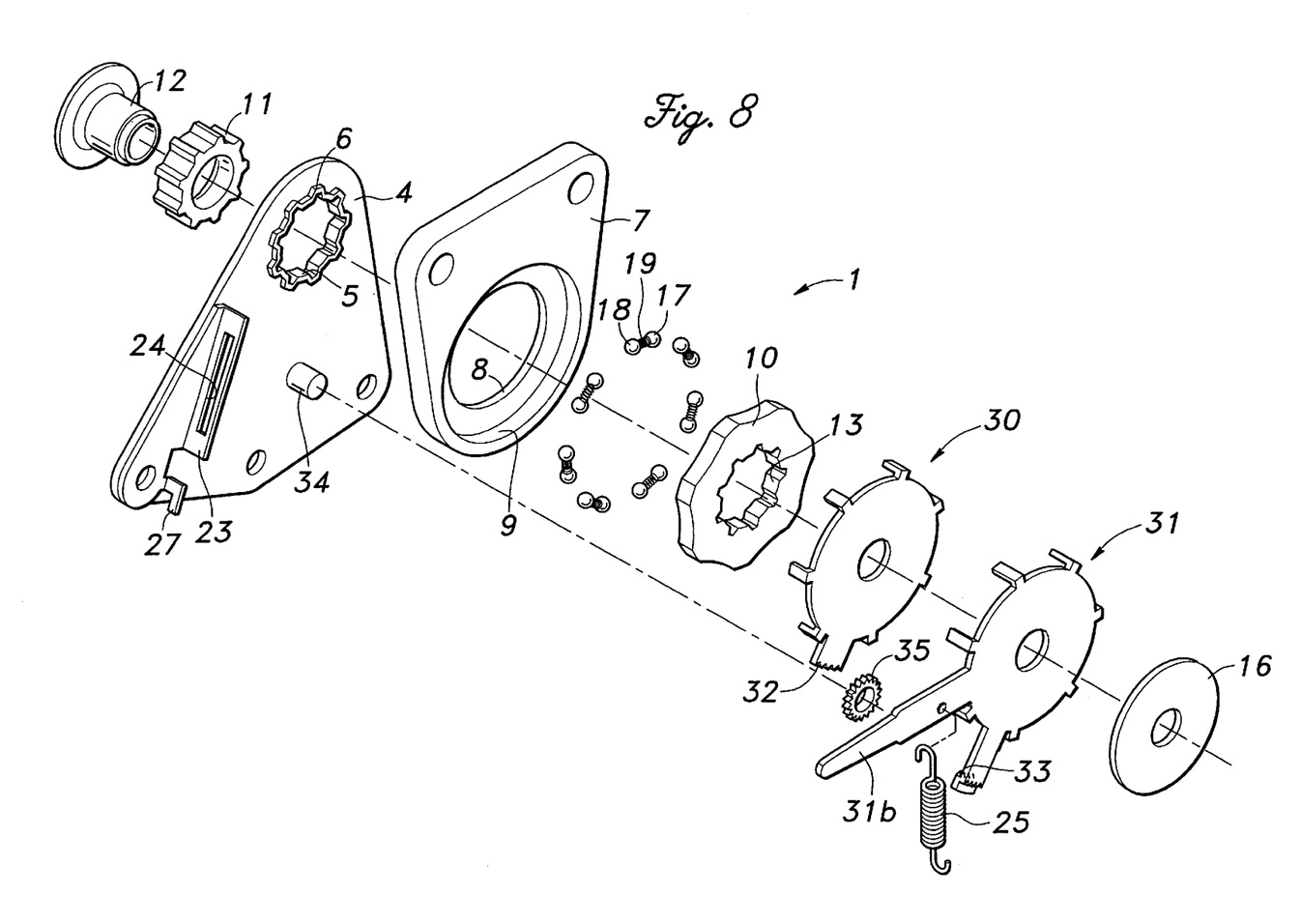
FIG. 8 is a view similar to FIG. 2 showing a second embodiment of the present invention.

FIG. 8 is a view similar to FIG. 2 showing a modified embodiment of the present invention, and the parts corresponding to those of FIG. 2 are denoted with like numerals without repeating the description of such parts.

Figure 9:
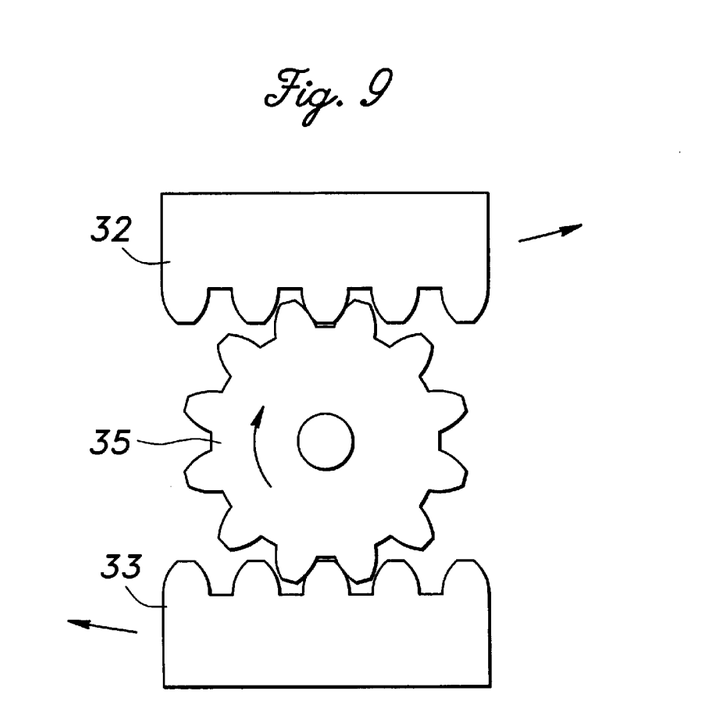
FIG. 9 is an enlarged side view of a part of the second embodiment.

This embodiment is different from the previous embodiment only in the arrangement for actuating a release member 30 corresponding to the release member 14 with another release member 31 corresponding to the release member 15. An actuation arm 31b extends radially from one of the release members 31, and is passed through the slot 24 formed in the upright piece 24. A tension coil spring 25 is engaged between an intermediate part of the actuation arm 31b and an engagement portion 27 provided in a lower part of the upright piece 23. One of the release members 31 is provided with a radial extension having an internal gear 33 formed thereon, and the other release member 30 is provided with a similar radial extension having an external gear 32 formed thereon. A pinion 35 is pivotally supported by the seat bottom bracket 4 via a pivot pin 34 in such a manner that the internal gear 33 and the external gear 32 mesh with each other via the pinion 35. In other words, an angular displacement of one of the release members 31 causes an angular displacement of the other release member 30 by an identical angle but in the opposite direction (FIG. 9).

This embodiment operates substantially in the same manner as the previous embodiment. The seat bottom bracket 4 and seat back bracket 7 can be held immobile under normal condition. When the actuation arm 31b is pulled upward against the spring force of the tension coil spring 25, the axial projections of the release members 30 and 31 dislodge the steel balls from the positions for wedging between the inner cam member 10 and the seat back bracket 7 so that the seat bottom bracket 4 and seat back bracket 7 can now freely rotate relative to each other.

The rotation limiting device of the present invention allows the relative angular position between the two parts to be adjusted in a continuous manner as opposed to the conventional recliner device which uses a combination of gear teeth and a pawl, and is therefore capable of angular adjustment only in a discrete manner. In some applications, it is desirable to provide a rotation limiting device on both sides of a seat, typically to ensure a high mechanical strength to the seat back against tilting. However, if a recliner device using a combination of gear teeth and a pawl is used on each side of a seat, because they can be locked only at discrete points, and some dimensional or positional errors are inevitable, either the recliner devices may fail to be locked simultaneously or the seat back is required to be twisted for the recliner devices to be locked simultaneously.

Figure 10:
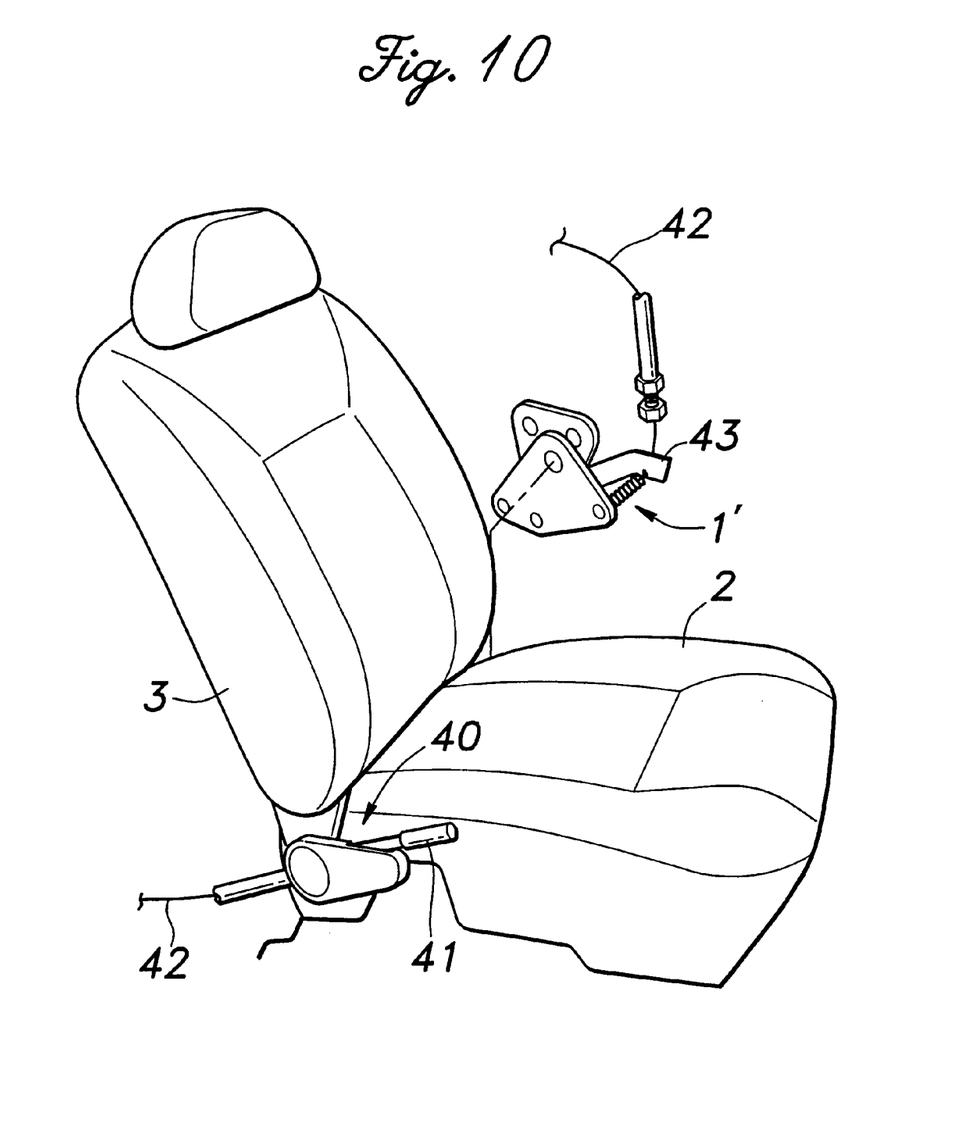
FIG. 10 is a view similar to FIG. 1 showing a different arrangement of seat recliner devices according to the present invention.

The embodiment illustrated in FIG. 10 addresses such a problem. The illustrated seat is a right hand side front seat for a motor vehicle, and is provided with a master recliner device 41 consisting of a conventional recliner device on the right hand side and a slave recliner device 1' incorporated with a rotation limiting device of the present invention on the left hand side. The master recliner device 41 is provided with a lever 41 for operating the recliner device in a conventional manner, and the motion of the lever 41 is transmitted to one end of a cable device 42. The slave recliner device 1' is provided with a lever 43 which is slightly modified so as to be connected to the other end of the cable device 42, instead of being adapted to be operated by hand. Thus, simply by operating the lever 41 of the master recliner device 40, the slave recliner device 1' is operated in synchronism with the master recliner device 40.

According to this arrangement, even though the master recliner device 41 is capable of angular adjustment only in a discrete manner or can be locked only at a number of discrete points, the slave recliner device 1' can be locked at any angular position so that the two recliner devices 41 and 1' can be synchronized to each other at all times. As a modification from this embodiment, it is also possible to use a recliner device incorporated with a rotation limiting device of the present invention for the master recliner device as well as for the slave recliner device.

Although the present invention has been described in terms of preferred embodiments thereof, it is obvious to a person skilled in the art that various alterations and modifications are possible without departing from the scope of the present invention which is set forth in the appended claims.

What is claimed is:

1. A rotation limiting device for selectively preventing a relative rotation between two members comprising:

a first member including an inner cam member defining a substantially circular outer circumferential surface;

a second member supported by said first member for relative rotation around a center of said outer circumferential surface and defining a substantially circular inner circumferential surface disposed coaxially with respect to said outer circumferential surface so as to define an annular gap between said inner and outer circumferential surfaces;

a first roller member received in said annular gap so as be selectively wedged between said inner and outer circumferential surfaces to oppose a relative rotation of said first and second members in a first direction; a second roller member received in said annular gap so as to be selectively wedged between said inner and outer circumferential surfaces to oppose a relative rotation of said first and second members in a second direction which is opposite from said first direction; and a pair of actuation members which are adapted to act upon said roller members so as to selectively disengage said roller members from a wedging engagement between said inner and outer circumferential surfaces, said actuation members being rotatably supported by one of said first and second members, and each provided with an axial projection which is adapted to act upon a corresponding one of said roller members to displace it away from said wedging engagement.

2. A rotation limiting device according to claim 1, wherein said gap defines at least one chamber which has a relatively wide middle part and gets progressively narrower toward each circumferential end, and each of said roller members is narrower than said relatively wide middle part of said chamber, but wider than said circumferential ends of said chamber.

3. A rotation limiting device according to claim 2, further comprising a spring member disposed in said annular gap to urge said roller members so as to be wedged between said inner and outer circumferential surfaces.

4. A rotation limiting device according to claim 3, wherein said spring member is interposed between said roller members.

5. A rotation limiting device according to claim 4, wherein said spring member consists of a compression coil spring.

6. A rotation limiting device according to claim 1, wherein said inner cam member is provided with a substantially polygonal outer circumferential surface and a plurality of chambers are defined between said inner cam member and said substantially circular inner circumferential surface of said second member.

7. A rotation limiting device according to claim 1, wherein said first member is provided with an opening surrounded by a collar extending in an axial direction, and said second member is provided with an opening rotatably receiving said collar.

8. A rotation limiting device according to claim 7, wherein said annular gap between said inner and outer circumferential surfaces of said first and second members is flanked by a surface defined by a part of said second member extending between said opening and inner circumferential surface thereof.

9. A rotation limiting device according to claim 1, wherein said first member includes a bracket member provided with an opening defining an inner profile similar to an internal gear and said inner cam member is also provided with a conformal opening, a small gear being passed into said openings of said bracket member and said inner cam member so as to join said two members in a rotational fast manner.

10. A rotation limiting device according to claim 1, wherein each of said actuation members comprises a disk member coaxially and rotatably disposed with respect to said first and second members.

11. A rotation limiting device according to claim 1, wherein each of said actuation members is provided with a radial extension including a cam surface, said rotation limiting device further including a lever member pivotally supported by one of said first and second members and provided with a cam follower member which simultaneously acts upon said cam surfaces of said radial extensions.

12. A rotation limiting device according to claim 1, wherein one of said actuation members is provided with an extension serving as an arm adapted to be actuated from outside, and a power transmitting member is rotatably supported by one of said first and second members for transmitting an angular displacement of said one actuation member to the other actuation member as an identical angular displacement in an opposite direction.

* * * * *